Sept. 7, 1943.     R. G. LE TOURNEAU     2,328,817
SELF-ENERGIZING BRAKE UNIT
Filed Jan. 31, 1942

INVENTOR
R.G. LeTourneau
BY
*Corbin Webster*
ATTYS

Patented Sept. 7, 1943

2,328,817

UNITED STATES PATENT OFFICE 2,328,817

SELF-ENERGIZING BRAKE UNIT

Robert G. Le Tourneau, Peoria, Ill., assignor to R. G. Le Tourneau, Inc., a corporation Application January 31, 1942, Serial No. 429,125

5 Claims. (Cl. 188—77)

The present invention is an improvement in self-energizing brake units, and in particular the invention is directed to a unique form of brake unit especially designed for embodiment in a power hoist of that type known as a power control unit, and which is commonly employed on tractors to control the operation of a connected implement; such a power control unit being shown for example in United States Letters Patent No. 1,912,645, dated June 6, 1933.

The principal object of the present invention is to provide a self-energizing brake unit which includes in the combination of a brake drum and a cooperating brake band, a brake band of novel configuration and mounting, such band being in the form of a metallic strap having a plurality of turns encircling the drum in side by side or helical relation.

Another object of this invention is to provide a brake unit in which the brake band is a helically wound strap, as above, and which strap tapers in width from end to end; the wide end of the strap being secured to a dead-end link and the narrow end of the strap being connected with the brake release link.

A further object of the invention is to provide a brake unit in which the brake band comprises a helically wound strap and which strap is initially formed as loops or turns in side by side helical relation, such loops or turns being of a diameter slightly less than the diameter of the brake drum whereby the turns must be expanded somewhat for placement on the drum, whereby the strap thereafter normally exerts a frictional drag on the drum and assures proper self-energizing of the brake unit.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views.

Figure 1:
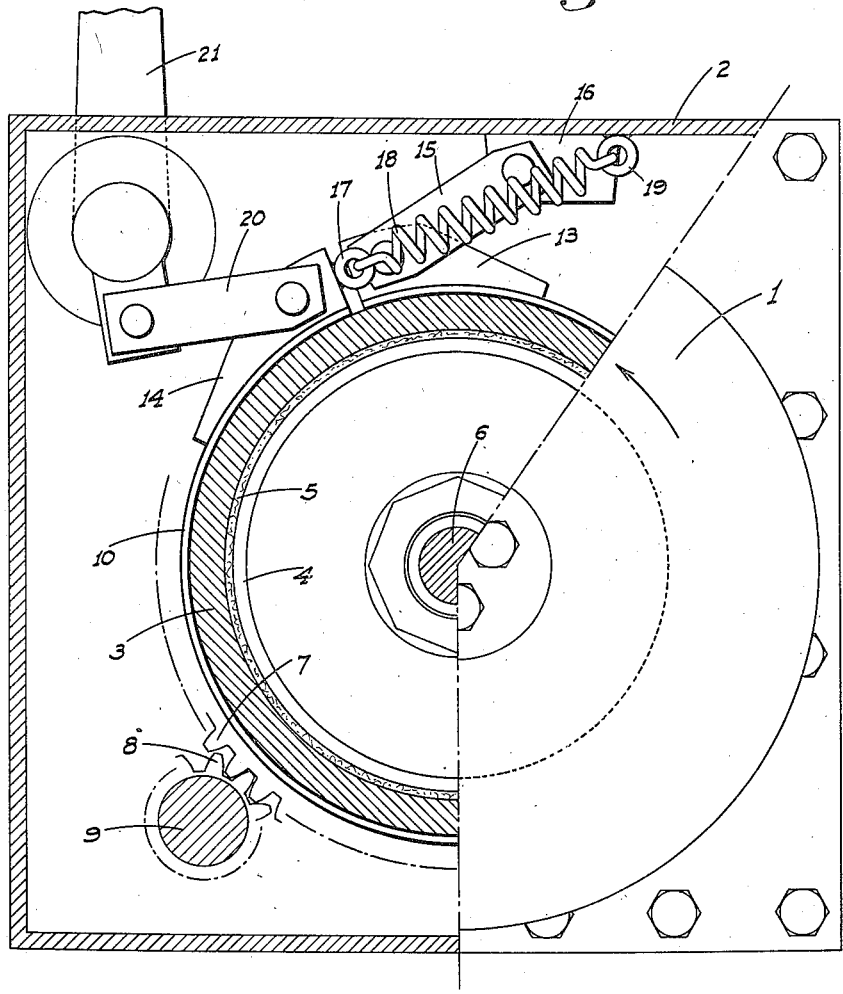
Figure 1 is an end view, mainly in section, of a power control unit embodying the present invention.
Figure 2:
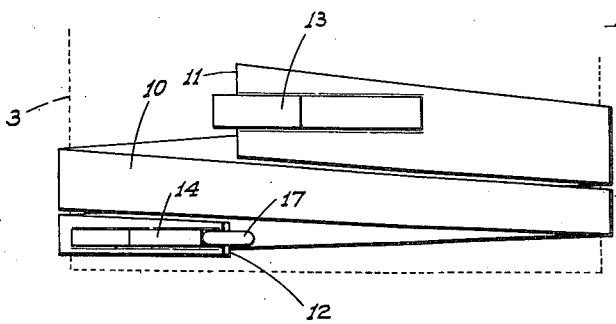
Figure 2 is a plan view of the novel form of brake band detached.

Referring now more particularly to the characters of reference on the drawing, the invention is here shown as embodied in a power control unit which includes a cable drum 1 disposed outwardly of one end of the power control unit housing 2; such cable drum being supported from the housing in unitary connection with the brake drum 3, as is customary in a power control unit of this type. This brake drum is disposed within housing 2, and is here shown as being intermittently driven or rotated in one direction through the medium of a cone clutch element 4 faced with friction material 5 and selectively engageable with the inner periphery of drum 3 as a cooperating clutch element. Clutch element 4 is turnably and slidably mounted on a shaft 6 in the housing, and is provided with a gear 7 thereabout meshing with a pinion 8 formed on a driven shaft 9 journaled in the housing. The specific mounting and operation of the brake drum, however, forms no part of this invention, and is shown in detail in my copending application, Ser. No. 429,123, filed January 31, 1942.

The invention here resides in the form and mounting of the brake band which cooperates with the outer peripheral face of brake drum 3. The brake band, which is indicated at 10, comprises a relatively long spring steel strap which is formed with a constant taper from one end to the other. For a drum having an approximate diameter of 8½", the brake band strap is about 50" long and tapers from 1½" in width at the wide end 11 to ½" in width at the narrow end 12. This tapering metal strap 10 which forms the brake band winds about the drum 3 with the turns in closely spaced side by side or helical relation; the ends of the band terminating at substantially the same point circumferentially of the brake drum but in spaced relation axially thereof. The tapering strap 10 is initially formed with the turns in side by side or helical relation, and as formed such turns are of a diameter slightly less than the diameter of brake drum 3, whereby said turns of the strap must be expanded somewhat before placement of the strap on the drum. As a consequence, the strap 10 constantly contacts and normally exerts a friction grip on the brake drum.

The ends 11 and 12 of strap 10 are disposed adjacent the top of brake drum 3, and at such ends the strap is fitted with upstanding ears indicated at 13 and 14 respectively. The ear 13, which is on the wide end of the strap 10, is connected by a pivotally mounted dead-end link 15 with an anchor bracket 16 which is rigid with and depends from the top of housing 2. The link 15 overhangs the adjacent end portion of the strap and extends from ear 13 at an upward slope and in a direction generally opposite to the direction of drive of drum 1, as indicated by the arrow thereon.

An eye 17 is formed on ear 14 and a relatively light tension spring 18 connects eye 17 and another eye 19 which is mounted on the top of housing 2 adjacent bracket 16, whereby spring 18 and link 15 extend in substantially the same direction.

Another link 20 is pivotally connected with ear 14 and extends therefrom in a direction substantially opposite spring 18; the link 20 being pivoted at its outer end on the lower end of an upstanding pivoted control lever 21 which projects to a point exteriorly of housing 2 for manual actuation.

In operation, when the clutch is engaged, the cable drum 1 is driven in the direction indicated by the arrow thereon, which is the direction which winds the cable about such drum. With rotation of brake drum 3 in such direction, the friction normally existent between said brake drum and strap 10 effects an unwrapping action on such strap and consequently a brake releasing action, which occurs against the tension of spring 18. In other words, the brake unit "over runs" when the cable drum 1 is actuated to wind the cable thereon to lift the load with which the cable is connected.

When the clutch is released and the load pulls on the cable and tends to rotate cable drum 1 in the opposite or unwinding direction, the normal friction between brake drum 3 and strap 10 effects a wrapping action of such strap in a direction to set the brake and which setting is caused by link 15 swinging downward, spring 18 taking up any slack in the strap and the latter frictionally locking with brake drum 3 and holding cable drum 1 against rotation.

When it is desired to permit cable drum 1 to reverse and pay out the cable under the pull of the load, the lever 21 is actuated in a direction to pull link 20 in a direction away from spring 18, this motion releasing the friction grip of strap 10 on brake drum 3, permitting the latter to rotate.

The reason for forming the brake strap 10 in tapered form is that the most intense strain is had in the vicinity of the self-energizing brake link 15 and to which link the wide end of the strap is therefore connected. Further, by tapering the strap, the total width of the strap unit, and consequently the brake drum, is materially reduced over that which would be required if the strap were a constant width throughout from its relatively wide end 11.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In a brake structure which includes a drum and a brake band unit cooperating therewith; said unit including a strap having a plurality of turns encircling the drum in side by side relation, a self-energizing brake link pivotally connected with one end of said strap, a spring connected with the other end of the strap and urging the latter in a braking direction, and normally inactive, manually actuated means arranged with said other end of the strap operative to urge the latter in a brake release direction and against the force of said spring; said strap tapering from end to end, the link being connected with the strap at its wide end, and the spring being connected with the strap at its narrow end.

2. In a brake structure which includes a drum and a brake band unit cooperating therewith; said unit including a strap having a plurality of turns encircling the drum in side by side relation, the ends of the strap terminating at substantially the same point circumferentially of the brake drum but in spaced relation axially of said drum, an upstanding ear secured on the strap at each end, a link pivoted at one end on one ear and extending therefrom at an outward slope in overhanging relation to the corresponding end of the strap, an anchor adjacent the outer end of the link and to which anchor said end of the link is pivoted, a spring connected with the other ear and normally urging the strap in a braking direction, and manually controlling means to urge said other ear in a direction to release the strap.

3. A brake structure as in claim 2 in which said spring is of tension type and extends from said other ear in the same direction as said link.

4. In a brake structure which includes a drum, and a brake strap having a plurality of turns encircling the drum in side by side relation, said strap tapering from end to end; means anchoring said strap at its wide end, a spring connected with the strap at its narrow end in brake-setting relation to said strap, and normally inactive brake releasing means connected with the strap at its narrow end and in opposed relation to said spring.

5. A brake structure as in claim 4 in which said anchoring means includes a pivotally mounted, self-energizing brake link; the wide end of said strap being secured in connection with one end of said link.

ROBERT G. LE TOURNEAU.